E. O. BARSTOW.
PROCESS OF MAKING BROMIN.
APPLICATION FILED NOV. 6, 1911.
1,141,921.
Patented June 8, 1915.
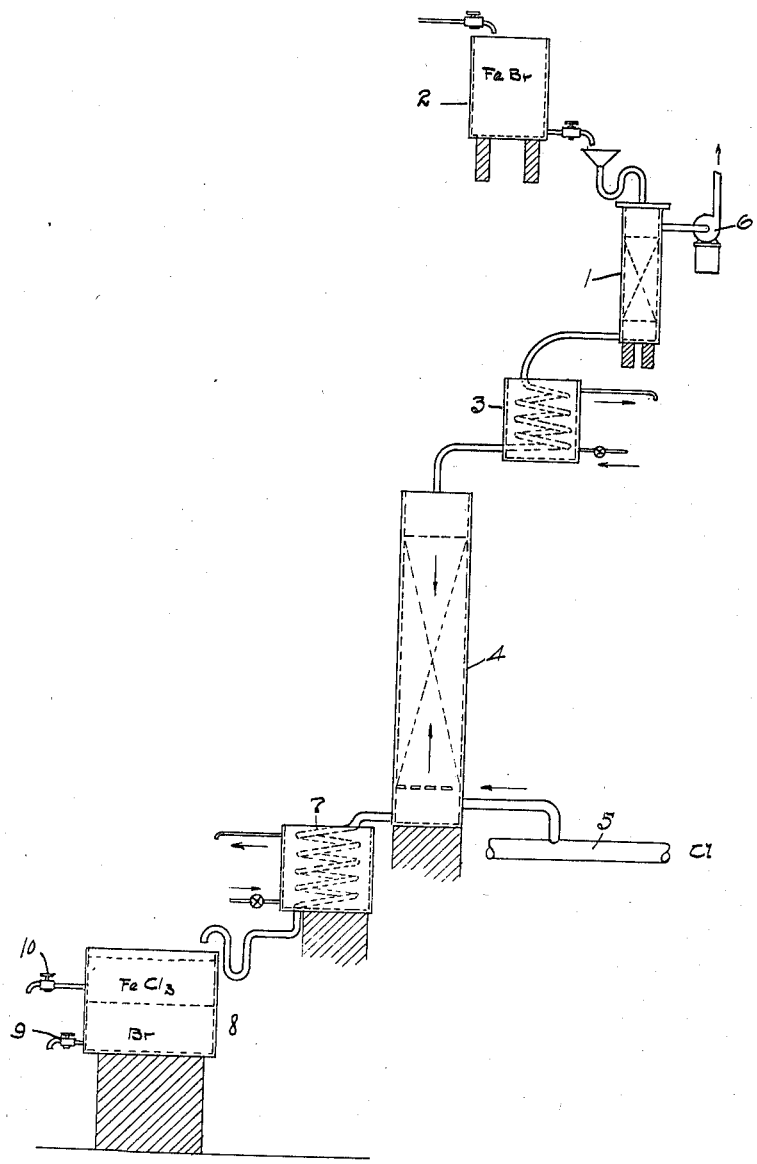

UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

PROCESS OF MAKING BROMIN.

1,141,921.      Specification of Letters Patent.      Patented June 8, 1915.

Application filed November 6, 1911. Serial No. 658,658.

*To all whom it may concern:*

Be it known that I, EDWIN O. BARSTOW, a citizen of the United States, and a resident of Midland, county of Midland, and State of Michigan, have invented a new and useful Improvement in Processes of Making Bromin, of which the following is a specification, the principle of the invention being herein explained and the best mode in which I have contemplated applying that principle, so as to distinguish it from other inventions.

In the ordinary method of manufacturing liquid bromin, the mother liquid obtained by concentration of the natural brine is boiled with an acid and an oxidizing agent, whereby the bromin is liberated. The latter, together with the accompanying steam, is then cooled and condensed to bromin and water, the bromin being subsequently separated by stratification, since it is but slightly soluble in water and is of a different specific gravity. This method of manufacturing bromin, however, proves expensive because of the great weight of the solution from which the bromin is distilled, a large size apparatus being required to handle the volume of liquid involved, and a large amount of heat being necessary in order to bring the solution to the boiling point and continue the boiling during the distillation proper.

The object of the present invention is to provide a method of making liquid bromin which will not require any distillation of the bromin in the form of bromin vapor by means of steam; instead the bromin is at once obtained in desired liquid form, separable by gravity from the accompanying liquid.

To the accomplishment of the foregoing and related ends the invention then consists of the steps hereinafter described and particularly pointed out in the claims.

The annexed drawing and the following description sets forth one approved method of carrying out the invention, such disclosed mode, however, constituting but one of the various ways in which the principle of the invention may be used.

In said annexed drawings the single figure there appearing illustrates in diagrammatic form an apparatus adapted for the carrying out of the process.

In view of the diagrammatic character of the drawing no detailed description thereof is deemed necessary, other than that involved in setting forth the several steps or operations of the process. In carrying on the latter then, a strong iron bromid solution is fed into the top of a tailings tower or column 1, such solution being supplied from a tank 2 or other source as most convenient. After going down through the tailings column, the solution passes through a condensing coil 3 and thence through a reaction column 4 in the latter of which it meets a rising stream of chlorin gas supplied from a main 5. The chlorin reacts with the iron bromid, forming iron chlorid and liquid bromin in accordance with the following reaction, where the value of $x$ and $y$ vary with the relative proportions of $FeBr_2$ and $FeBr_3$ in the iron bromid solution.

$$FeBr_x + Cl_y = FeCl_3 + xBr.$$

A strong iron chlorid solution and liquid bromin are thus produced, the latter being but sparingly soluble in the former. Some heat is generated in this reaction which may indeed vaporize part of the bromin, but such bromin vapors will be condensed in the condenser 3 and flow back into the column 4. Should any small quantity of bromin vapor be carried through by the air, which may be intermingled with the entering chlorin, it will be absorbed in the tailings tower 1 by the fresh iron bromid solution entering from tank 2, since such solution usually contains some ferrous bromid, since strong ferric bromid solution is a good mechanical absorber of bromin, and the ferrous bromin usually present an active chemical absorbent. The bromin is thus kept from escaping from the system, while any air fed into the reaction column with the chlorin escapes from the system through the exhauster 6 that maintains the flow of chlorin upwardly through the reaction column 4. The mixture of strong iron chlorid and liquid bromin flows in the opposite direction through said reaction column and from it through a cooling worm 7 to a container 8, where the bromin is allowed to separate by gravity from such chlorid solution. The bromin, being the heavier will sink to the bottom, and the stratification is sufficiently distinct to render it possible to draw off the two liquids by separate spigots 9 and 10 as indicated in the drawing. The bromin thus obtained usually contains considerable chlorin and this is removed by agitating it with a bromid solution, preferably iron bromid, such as used in the principal reaction. A very small portion of the bromin, moreover, will remain dissolved in the iron chlorid solution, but this can be removed, if desired, by blowing it out with a blast of air and absorbing it in any suitable way, as for example with a solution of ferrous bromid.

The foregoing process has the advantage over any prior process of which I have knowledge, in that heretofore it has always been necessary to distil of the bromin in the form of bromin vapor, by heating the solution in which it is mixed, by injecting steam therein. The present process however, does not require any steam and at the same time does away with the necessity of handling hot bromin vapors which are not only very corrosive, but also unpleasant to deal with. Said process has the further advantage that when a sufficiently strong solution of iron bromid is used, a solution of iron chlorid is obtained of a specific gravity of 35 degrees Baumé, or more. Iron chlorid solution of this strength is an article of commerce; whereas if the bromin were separated as in prevailing processes, by the injection of live steam, this chlorid solution would be so diluted by the condensed steam as to require concentration before it would be available for sale or ordinary commercial use.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The process of making bromin, which consists in treating iron bromid solution with chlorin, whereby iron chlorid solution is formed and bromin set free, the iron bromid solution being of such strength as to produce an iron chlorid solution wherein such bromin is practically insoluble so as to cause such bromin to collect as a liquid; and then separating the bromin from such iron chlorid solution.

2. The process of making bromin, which consists in treating iron bromid solution with chlorin, whereby iron chlorid solution is formed and bromin set free, the iron bromid solution being of such strength as to produce an iron chlorid solution wherein such bromin is practically insoluble so as to cause such bromin to collect as a liquid; and then allowing the bromin to separate by gravity from the iron chlorid solution.

3. The process of making bromin, which consists in treating iron bromid solution with chlorin, whereby iron chlorid solution is formed and bromin set free, the iron bromid solution being of such strength as to produce an iron chlorid solution wherein such bromin is practically insoluble so as to cause such bromin to collect as a liquid; allowing the bromin to separate by gravity from the iron chlorid solution; and then drawing off such bromin and removing any traces of chlorin therefrom.

4. The process of making bromin, which consists in treating iron bromid solution with chlorin, whereby iron chlorid solution is formed and bromin set free, the iron bromid solution being of such strength as to produce an iron chlorid solution wherein such bromin is practically insoluble so as to cause such bromin to collect as a liquid; allowing the bromin to separate by gravity from the iron chlorid solution; and then drawing off such bromin and agitating the same with more iron bromid solution to remove any traces of chlorin therefrom.

5. The process of making bromin, which consists in treating a strong solution of iron bromid with chlorin gas, whereby iron chlorid solution is formed and bromin set free, the resulting iron chlorid solution being of such strength as to render such bromin practically insoluble therein so as to cause the same to collect as a liquid; allowing the bromin to separate out by gravity from the iron chlorid solution; and then drawing off such bromin and agitating the same with more iron bromid solution to remove any traces of chlorin therefrom.

6. The process of making bromin, which consists in treating a strong solution of iron bromid, with chlorin gas, whereby chlorid solution is formed and bromin set free, the resulting iron chlorid solution being of such strength as to render such bromin practically insoluble therein, so as to cause the same to collect as a liquid; allowing the bromin to separate out by gravity from the iron chlorid solution; drawing off such bromin and removing any traces of chlorin therefrom; and then recovering any traces of bromin in said iron chlorid solution.

7. The process of making bromin, which consists in treating a strong solution of iron bromid with chlorin gas, whereby chlorid solution is formed and bromin set free, the resulting iron chlorid solution being of such strength as to render such bromin practically insoluble therein, so as to cause the same to collect as a liquid; allowing the bromin to separate out by gravity from the iron chlorid solution; drawing off such bromin and agitating the same with more iron bromid to remove any traces of chlorin therefrom; and then blowing out with air any traces of bromin in said iron chlorid solution and suitably absorbing the same.

8. In a process of making bromin, the step which consists in treating iron bromid solution with chlorin, whereby iron chlorid solution is formed and bromin set free, the iron chlorid solution being of such strength as to render such bromin practically insoluble therein, so as to cause the same to collect as a liquid.

9. In a process of making bromin, the step which consists in treating strong iron bromid solution with chlorin gas, whereby iron chlorid solution is formed and bromin set free, the resulting iron chlorid solution being of such strength as to render such bromin practically insoluble therein, so as to cause the same to collect as a liquid.

Signed by me this 3rd day of Nov., 1911.

EDWIN O. BARSTOW

Attested by—
  ANNA L. GILL,
  JNO. F. OBERLIN.